United States Patent
Asghari-Kamrani et al.

(10) Patent No.: US 10,769,297 B2
(45) Date of Patent: *Sep. 8, 2020

(54) CENTRALIZED IDENTIFICATION AND AUTHENTICATION SYSTEM AND METHOD

(71) Applicants: Nader Asghari-Kamrani, Centreville, VA (US); Kamran Asghari-Kamrani, Centreville, VA (US)

(72) Inventors: Nader Asghari-Kamrani, Centreville, VA (US); Kamran Asghari-Kamrani, Centreville, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/639,020

(22) Filed: Jun. 30, 2017

(65) Prior Publication Data
US 2017/0308716 A1    Oct. 26, 2017

Related U.S. Application Data

(63) Continuation of application No. 13/606,538, filed on Sep. 7, 2012, now Pat. No. 9,727,864, which is a
(Continued)

(51) Int. Cl.
*G06F 21/31* (2013.01)
*G06F 21/62* (2013.01)
(Continued)

(52) U.S. Cl.
CPC .......... *G06F 21/6245* (2013.01); *G06F 21/31* (2013.01); *G06F 21/40* (2013.01);
(Continued)

(58) Field of Classification Search
CPC ...... G06F 21/6245; G06F 21/31; G06F 21/40; G06F 2221/2115; G06Q 20/04;
(Continued)

(56) References Cited

U.S. PATENT DOCUMENTS 4,747,050 A    5/1988  Brachtl et al.
4,849,613 A *  7/1989  Eisele .............. G06Q 20/40975
                                                        235/379
(Continued)

FOREIGN PATENT DOCUMENTS

EP    0722241 A2    7/1996
EP    1077436 A2    2/2001
(Continued)

OTHER PUBLICATIONS

WebSiteforFREE.com first to offer equifax identity authentication solution to small businesses. (Jul. 25, 2000). Business Wire Retrieved from https://dialog.proquest.com/professional/docview/671736327?accountid=131444 on Jun. 15, 2020 (Year: 2000).*
(Continued)

*Primary Examiner* — Kito R Robinson
(74) *Attorney, Agent, or Firm* — Resolute Legal PLLC

(57) ABSTRACT

Systems and methods are provided for enabling online entities to determine whether a user is truly the person who he says using a two-factor authentication technique and authenticating user's identity utilizing an authenticator.

29 Claims, 5 Drawing Sheets

Related U.S. Application Data continuation of application No. 12/210,926, filed on Sep. 15, 2008, now Pat. No. 8,266,432, which is a continuation-in-part of application No. 11/239,046, filed on Sep. 30, 2005, now Pat. No. 7,444,676, which is a continuation-in-part of application No. 09/940,635, filed on Aug. 29, 2001, now Pat. No. 7,356,837, said application No. 12/210,926 is a continuation-in-part of application No. 11/333,400, filed on Jan. 18, 2006, now Pat. No. 8,281,129, which is a continuation-in-part of application No. 09/940,635, filed on Aug. 29, 2001, now Pat. No. 7,356,837.

(60) Provisional application No. 60/615,603, filed on Oct. 5, 2004, provisional application No. 60/650,137, filed on Feb. 7, 2005.

(51) Int. Cl.

| | | |
|---|---|---|
| *G06Q 20/38* | (2012.01) | |
| *G06Q 20/04* | (2012.01) | |
| *G06Q 20/36* | (2012.01) | |
| *G06Q 20/34* | (2012.01) | |
| *G06Q 20/40* | (2012.01) | |
| *H04L 29/06* | (2006.01) | |
| *G07F 7/10* | (2006.01) | |
| *G06F 21/40* | (2013.01) | |
| *G06Q 30/02* | (2012.01) | |

(52) U.S. Cl.
CPC .......... *G06Q 20/04* (2013.01); *G06Q 20/341* (2013.01); *G06Q 20/3674* (2013.01); *G06Q 20/382* (2013.01); *G06Q 20/385* (2013.01); *G06Q 20/40* (2013.01); *G06Q 20/4014* (2013.01); *G07F 7/1008* (2013.01); *H04L 63/08* (2013.01); *G06F 2221/2115* (2013.01); *G06Q 30/0225* (2013.01); *H04L 63/0421* (2013.01); *H04L 63/0838* (2013.01)

(58) Field of Classification Search
CPC ............ G06Q 20/341; G06Q 20/3674; G06Q 20/382; G06Q 20/385; G06Q 20/40; G06Q 20/4014; G06Q 30/0225; G07F 7/1008; H04L 63/08; H04L 63/0421; H04L 63/0838
USPC ......................................................... 705/44
See application file for complete search history.

(56) References Cited

U.S. PATENT DOCUMENTS

| | | | |
|---|---|---|---|
| 4,885,778 A | 12/1989 | Weiss | |
| 4,965,568 A | 10/1990 | Atalla et al. | |
| 5,363,449 A * | 11/1994 | Bestock | G06Q 20/38215 705/72 |
| 5,535,276 A | 7/1996 | Ganesan | |
| 5,563,946 A | 10/1996 | Cooper | |
| 5,592,553 A | 1/1997 | Guski et al. | |
| 5,655,004 A * | 8/1997 | Holbrook | H04W 12/1206 455/411 |
| 5,668,876 A | 9/1997 | Falk et al. | |
| 5,732,137 A | 3/1998 | Aziz | |
| 5,740,361 A | 4/1998 | Brown | |
| 5,790,785 A | 8/1998 | Klug | |
| 5,802,176 A | 9/1998 | Audebert | |
| 5,815,665 A | 9/1998 | Teper et al. | |
| 5,818,738 A | 10/1998 | Effing | |
| 5,838,812 A | 11/1998 | Pare, Jr. et al. | |
| 5,881,226 A | 3/1999 | Veneklase | |
| 5,883,810 A | 3/1999 | Franklin et al. | |
| 5,884,280 A * | 3/1999 | Yoshioka | G06Q 20/0855 705/26.1 |
| 6,014,650 A * | 1/2000 | Zampese | G06Q 20/102 235/380 |
| 6,067,621 A | 5/2000 | Yu et al. | |
| 6,078,908 A * | 6/2000 | Schmitz | G06F 21/43 705/50 |
| 6,102,287 A * | 8/2000 | Matyas, Jr. | G06Q 20/00 235/380 |
| 6,161,185 A | 12/2000 | Guthrie et al. | |
| 6,233,565 B1 | 5/2001 | Lewis et al. | |
| 6,236,981 B1 | 5/2001 | Hill | |
| 6,300,873 B1 | 10/2001 | Kucharczyk et al. | |
| 6,338,140 B1 | 1/2002 | Owens et al. | |
| 6,529,885 B1 | 3/2003 | Johnson | |
| 6,539,092 B1 | 3/2003 | Kocher | |
| 6,598,032 B1 * | 7/2003 | Challener | G06Q 20/382 705/64 |
| 6,615,353 B1 * | 9/2003 | Hashiguchi | G06F 21/34 380/262 |
| 6,678,666 B1 | 1/2004 | Boulware | |
| 6,687,375 B1 | 2/2004 | Matyas, Jr. et al. | |
| 6,715,082 B1 | 3/2004 | Chang et al. | |
| 6,728,884 B1 * | 4/2004 | Lim | H04L 63/0815 709/219 |
| 6,748,367 B1 | 6/2004 | Lee | |
| 6,845,453 B2 | 1/2005 | Scheidt et al. | |
| 6,901,387 B2 | 5/2005 | Wells et al. | |
| 6,904,526 B1 * | 6/2005 | Hongwei | G06F 21/31 713/172 |
| 6,957,185 B1 | 10/2005 | Labaton | |
| 6,957,199 B1 * | 10/2005 | Fisher | G06Q 20/02 705/50 |
| 6,985,583 B1 * | 1/2006 | Brainard | G06F 21/31 380/277 |
| 6,993,658 B1 | 1/2006 | Engberg et al. | |
| 7,010,695 B1 * | 3/2006 | Mizuguchi | G06F 21/31 709/203 |
| 7,016,877 B1 * | 3/2006 | Steele | G06Q 20/3674 705/50 |
| 7,043,635 B1 | 5/2006 | Keech | |
| 7,065,786 B2 | 6/2006 | Taguchi | |
| 7,096,204 B1 | 8/2006 | Chen et al. | |
| 7,111,173 B1 | 9/2006 | Scheidt | |
| 7,150,038 B1 | 12/2006 | Samar | |
| 7,171,694 B1 | 1/2007 | Jespersen et al. | |
| 7,236,956 B1 | 6/2007 | Ogg et al. | |
| 7,237,117 B2 | 6/2007 | Weiss | |
| 7,324,972 B1 | 1/2008 | Oliver et al. | |
| 7,334,735 B1 | 2/2008 | Antebi et al. | |
| 7,353,541 B1 | 4/2008 | Ishibashi et al. | |
| 7,356,837 B2 | 4/2008 | Asghari-Kamrani | |
| 7,392,388 B2 | 6/2008 | Keech | |
| 7,434,723 B1 | 10/2008 | White et al. | |
| 7,444,676 B1 | 10/2008 | Asghari-Kamrani | |
| 7,546,274 B2 | 6/2009 | Ingram et al. | |
| 7,562,218 B2 * | 7/2009 | Kirkup | G06F 21/34 380/44 |
| 7,606,771 B2 * | 10/2009 | Keresman, III | C07D 209/88 705/67 |
| 7,716,129 B1 * | 5/2010 | Tan | G06Q 20/02 705/35 |
| 7,822,666 B1 | 10/2010 | Bursch | |
| 7,917,444 B1 | 3/2011 | Bursch | |
| 7,949,603 B1 | 5/2011 | Cao et al. | |
| 8,245,292 B2 | 8/2012 | Buer | |
| 8,266,432 B2 | 9/2012 | Asghari-Kamrani | |
| 8,281,129 B1 | 10/2012 | Asghari-Kamrani | |
| 8,751,801 B2 | 6/2014 | Harris et al. | |
| 2001/0032192 A1 | 10/2001 | Putta | |
| 2001/0039619 A1 * | 11/2001 | Lapere | G06Q 20/401 713/186 |
| 2001/0044787 A1 | 11/2001 | Shwartz et al. | |
| 2001/0047335 A1 * | 11/2001 | Arndt | G06Q 20/12 705/44 |
| 2001/0051924 A1 | 12/2001 | Uberti | |
| 2002/0029342 A1 * | 3/2002 | Keech | G06Q 20/382 713/184 |

(56) References Cited

U.S. PATENT DOCUMENTS

| | | |
|---|---|---|
| 2002/0040346 A1 | 4/2002 | Kwan |
| 2002/0042781 A1 | 4/2002 | Kranzley |
| 2002/0042879 A1* | 4/2002 | Gould .................. H04L 9/3226 713/176 |
| 2002/0046187 A1 | 4/2002 | Vargas et al. |
| 2002/0046189 A1 | 4/2002 | Morita et al. |
| 2002/0055907 A1* | 5/2002 | Pater .................... G06Q 20/10 705/39 |
| 2002/0069170 A1* | 6/2002 | Rizzo .................... G06Q 20/10 705/43 |
| 2002/0069174 A1 | 6/2002 | Fox et al. |
| 2002/0073046 A1 | 6/2002 | David |
| 2002/0083347 A1 | 6/2002 | Taguchi |
| 2002/0087483 A1 | 7/2002 | Harif |
| 2002/0091646 A1* | 7/2002 | Lake .................... G06Q 20/342 705/67 |
| 2002/0095569 A1 | 7/2002 | Jerdonek |
| 2002/0108062 A1* | 8/2002 | Nakajima .............. G06Q 20/04 726/9 |
| 2002/0116341 A1* | 8/2002 | Hogan ................ G06Q 20/3823 705/64 |
| 2002/0120584 A1* | 8/2002 | Hogan ................ G06Q 20/027 705/67 |
| 2002/0120587 A1 | 8/2002 | D'Agostino |
| 2002/0123935 A1 | 9/2002 | Asghari-Kamrani et al. |
| 2002/0133412 A1 | 9/2002 | Oliver et al. |
| 2002/0169988 A1* | 11/2002 | Vandergeest ........ H04L 63/0823 726/4 |
| 2002/0177433 A1 | 11/2002 | Bravo et al. |
| 2002/0184143 A1 | 12/2002 | Khater |
| 2002/0188481 A1 | 12/2002 | Berg et al. |
| 2003/0004876 A1* | 1/2003 | Jacobson ............. H04M 17/026 705/41 |
| 2003/0037009 A1* | 2/2003 | Tobin .................... G06Q 10/08 705/65 |
| 2003/0046237 A1 | 3/2003 | Uberi |
| 2003/0046571 A1 | 3/2003 | Nakayama |
| 2003/0069848 A1* | 4/2003 | Larson .................... H04L 41/22 705/50 |
| 2003/0074317 A1 | 4/2003 | Hofi |
| 2003/0080183 A1 | 5/2003 | Rajasekaran et al. |
| 2003/0159054 A1* | 8/2003 | Fauble .................... G06F 21/83 713/189 |
| 2003/0163694 A1* | 8/2003 | Chen .................. H04L 63/0838 713/170 |
| 2003/0172272 A1 | 9/2003 | Ehlers et al. |
| 2004/0030601 A1* | 2/2004 | Pond .................... G06Q 20/322 705/16 |
| 2004/0030752 A1 | 2/2004 | Selgas et al. |
| 2004/0034502 A1* | 2/2004 | Jung .................... G06Q 30/04 702/178 |
| 2004/0103060 A1* | 5/2004 | Foth .................... G06Q 20/02 705/40 |
| 2004/0103287 A1 | 5/2004 | Newby |
| 2005/0010758 A1 | 1/2005 | Landrock et al. |
| 2005/0144484 A1* | 6/2005 | Wakayama ............. G06F 21/36 726/19 |
| 2005/0181775 A1* | 8/2005 | Rideout, Jr. .......... G06Q 10/109 455/414.3 |
| 2005/0222963 A1 | 10/2005 | Johnson |
| 2006/0015725 A1 | 1/2006 | Voice et al. |
| 2006/0094403 A1 | 5/2006 | Norefors et al. |
| 2006/0179304 A1* | 8/2006 | Han ........................ G06Q 30/04 713/168 |
| 2006/0269061 A1* | 11/2006 | Balasubramanian ........................ G06Q 20/3829 380/247 |
| 2006/0278698 A1 | 12/2006 | Lovett |
| 2007/0016804 A1 | 1/2007 | Kemshall |
| 2007/0022301 A1 | 1/2007 | Nicholson et al. |
| 2007/0050840 A1* | 3/2007 | Grandcolas ............ G07F 7/1008 726/5 |
| 2007/0073621 A1 | 3/2007 | Dulin et al. |
| 2007/0077916 A1 | 4/2007 | Saito |
| 2007/0107050 A1 | 5/2007 | Selvarajan |
| 2007/0130463 A1 | 6/2007 | Law et al. |
| 2007/0174904 A1 | 7/2007 | Park |
| 2008/0016003 A1 | 1/2008 | Hutchison et al. |
| 2008/0016347 A1* | 1/2008 | Maj ........................ G06F 21/34 713/168 |
| 2008/0230614 A1 | 9/2008 | Boalt |
| 2009/0089869 A1* | 4/2009 | Varghese ............ G06Q 20/4014 726/7 |
| 2010/0070757 A1 | 3/2010 | Martinez |
| 2010/0100724 A1 | 4/2010 | Kaliski, Jr. |
| 2013/0191889 A1 | 7/2013 | Asghari-Kamrani |
| 2014/0067675 A1 | 3/2014 | Leyva et al. |
| 2014/0081784 A1* | 3/2014 | Ahn ...................... G06Q 20/322 705/21 |
| 2014/0372767 A1 | 12/2014 | Green et al. |

FOREIGN PATENT DOCUMENTS

| | | |
|---|---|---|
| EP | 1107089 A1 | 6/2001 |
| EP | 1445917 A2 | 8/2004 |
| GB | 2352861 A | 2/2001 |
| WO | 95/19593 A1 | 7/1995 |
| WO | 97/31306 A1 | 8/1997 |
| WO | 0002150 A1 | 1/2000 |
| WO | 0072109 A2 | 11/2000 |
| WO | 91/99382 A2 | 12/2001 |

OTHER PUBLICATIONS

Lynn M. Lopucki, "Human Identification Theory and the Identity Theft Problem", Texas Law Review, vol. 80, 2001, pp. 89-134.
Daniel J. Solove, "Identity Theft, Privacy, and the Architechture of Vulnerability", Hastings Law Journal, vol. 54, No. 4, 2003, pp. 1-47.
"Experts struggle to fight online 'phishing' schemes", 2006, Retrieved from the internet: http://mybroadband.co.za/nephp/2254.html, pp. 1-3.
"2-Factor Authentication: Will Financial Institutions Really be More Secure", 2006, Retrieved from the internet: http://www.prweb.com/releases/2006/02/prweb342996.htm, pp. 1-4.
Federal Financial Institutions Examination Council, "Authentication in an Internet Banking Environment", 2001, Retrieved from the Internet: https://www.ffiec.gov/pdf/authentication_guidance.pdf, pp. 1-14.
PTO Non-Final Office Action dated Oct. 8, 2014, U.S. Appl. No. 13/633,680, pp. 1-21.
PTO Final Office Action dated Mar. 13, 2015, U.S. Appl. No. 13/633,680, pp. 1-10.
PTO Non-Final Office Action dated Oct. 19, 2015, U.S. Appl. No. 13/633,680, pp. 1-13.
PTO Final Office Action dated Mar. 23, 2016, U.S. Appl. No. 13/633,680, pp. 1-11.
PTO Notice of Allowance dated Sep. 12, 2016, U.S. Appl. No. 13/633,680, pp. 1-16.
PTO Notice of Allowance dated Dec. 2, 2016, U.S. Appl. No. 13/633,680, pp. 1-16.
*Nader Asghari-Kamrani and Kamran Asghari-Kamrani vs. United Services Automobile Association*, Opinion and Order dated Jul. 5, 2016, pp. 1-13.
M. Myers et al., "X.509 Internet Public Key Infrastructure Online Certificate Status Protocol—OCSP", No. RFC 2560, 1999, pp. 1-23.
B. Clifford Neuman et al., "Kerberos: An Authentication Service for Computer Networks", IEEE Communications Magazine, vol. 32, No. 9, Sep. 1994, pp. 33-38.
*United Services Automobile Association v. Nader Asghari-Kamrani et al.*, Decision Denying Institution of Inter Partes Review, Feb. 26, 2016, U.S. Pat. No. 8,266,432, pp. 1-17.
Connectotel Limited (Applicant), "Strong Authentication Method Using a Telecommunications Device", Application No. GB9929291.4 lodged Dec. 11, 1999, pp. 1-12.

(56) References Cited

OTHER PUBLICATIONS

Marcus Williams, "Implementing Strong Passwords in an NDS Environment", Aug. 2000, Retrieved from the internet: http://support.novell.com/techcenter/articles/ana20000802.html, pp. 1-7.

Marcus Williams, "Policy-Based Management of Mobile Phones", Mar. 2001, Retrieved from the internet: http://support.novell.com/techcenter/articles/ana20010302.html, pp. 1-7.

Teppo Halonen, "Authentication and Authorization in Mobile Environment", In Tik-110.501 Seminar on Network Security, 2001, pp. 1-17.

*United Services Automobile Association* vs. *Nader Asghari-Kamrani and Kamran Asghari-Kamrani*, Case CBM2016-00064, Decision: Granting Institution of Covered Business Method Patent Review 37 C.F.R. § 42.208 dated Sep. 21, 2016, pp. 1-36.

*United Services Automobile Association* vs. *Nader Asghari-Kamrani and Kamran Asghari-Kamrani*, Case CBM2016-00063, Decision: Granting Institution of Covered Business Method Patent Review 37 C.F.R. § 42.208 dated Sep. 21, 2016, pp. 1-42.

*Nader Asghari-Kamrani and Kamran Asghari-Kamrani* vs. *United Services Automobile Association*, Case 2:15-cv-00478-RGD-LRL, USAA's First Amended Counterclaims to First Amended Complaint dated Mar. 29, 2016, pp. 1-18.

*Nader Asghari-Kamrani and Kamran Asghari-Kamrani* vs. *United Services Automobile Association*, Case 2:15-cv-00478-RGD-LRL, USAA's First Amended Counterclaims to Plaintiffs' Second Amended Complaint dated Oct. 4, 2016, pp. 1-35.

*Nader Asghari-Kamrani and Kamran Asghari-Kamrani* vs. *United Services Automobile Association*, Case 2:15-cv-00478-RGD-LRL, USAA's Answer and Counterclaims to Plaintiffs' Second Amended Complaint dated Apr. 28, 2016, pp. 1-28.

*Nader Asghari-Kamrani and Kamran Asghari-Kamrani* vs. *United Services Automobile Association*, Case 2:15-cv-00478-RGD-LRL, USAA's Answer and Counterclaims to First Amended Complaint dated Mar. 8, 2016, pp. 1-22.

"New Version of Internet Access Software From Network TeleSystems Adds Support For Windows 95, Secure E-Mail, Multilink ISDN" Business Wire, Apr. 11, 1996. Retrieved from the Internet on Mar. 28, 2017, Accessible at https://www.thefreelibrary.com/New+Version+of+Internet+Access+Software+From+Network+TeleSystems+Adds...-a018179474, pp. 1-2.

R. Strack, "Challenges in Mobile Information Systems and Services." Retrieved from the Internet on Mar. 28, 2017: https://dialog.proquest.com/professional/docview/828562573?accountid=142257, pp. 1-2.

Non-Final Office Action dated Jul. 14, 2017, U.S. Appl. No. 15/614,164, pp. 1-37.

*United Services Automobile Association* vs. *Nader Asghari-Kamrani and Kamran Asghari-Kamrani*, Case CBM2016-00063, Final Written Decision 35 U.S.C. § 328(a); 37 C.F.R. § 42.73 dated Aug. 15, 2017, pp. 1-67.

*United Services Automobile Association* vs. *Nader Asghari-Kamrani and Kamran Asghari-Kamrani*, Case CBM2016-00064, Final Written Decision 35 U.S.C. § 328(a); 37 C.F.R. § 42.73 dated Aug. 15, 2017, pp. 1-63.

PTO Non-Final Office Action dated Apr. 6, 2018, U.S. Appl. No. 15/833,909, pp. 1-32.

PTO Notice of Allowance dated Jul. 10, 2018, U.S. Appl. No. 15/833,909, pp. 1-31.

PTO Final Office Action dated Mar. 22, 2019, U.S. Appl. No. 16/103,405, pp. 1-21.

PTO Non-Final Office Action dated Nov. 2, 2018, U.S. Appl. No. 16/103,405, pp. 1-41.

Aol Time Warner et al., "Children's Online Privacy Protection Rule Amendment—Comment P994504", Comments Before the Federal Trade Commission, Nov. 30, 2000, pp. 1-5.

\* cited by examiner

Registration Phase Steps: Ⓐ Ⓑ Ⓒ

Transaction Phase Steps: Ⓓ Ⓔ Ⓕ Ⓖ Ⓗ Ⓘ

Identification & Authorization Phase Steps: Ⓙ Ⓚ Ⓛ

CENTRALIZED IDENTIFICATION AND AUTHENTICATION SYSTEM AND METHOD

RELATED APPLICATIONS

This application is a continuation of U.S. patent application Ser. No. 13/606,538, filed Sep. 7, 2012, which is continuation of U.S. patent application Ser. No. 12/210,926, filed Sep. 15, 2008 (now U.S. Pat. No. 8,266,432), which is a continuation-in-part of U.S. patent application Ser. No. 11/239,046, filed Sep. 30, 2005 (now U.S. Pat. No. 7,444,676), which is a continuation-in-part of U.S. patent application Ser. No. 09/940,635, filed Aug. 29, 2001 (now U.S. Pat. No. 7,356,837), and claims benefit of U.S. Provisional Patent Application No. 60/615,603 Oct. 5, 2004. U.S. patent application Ser. No. 12/210,926 is a continuation-in-part of U.S. patent application Ser. No. 11/333,400, filed Jan. 18, 2006 (now U.S. Pat. No. 8,281,129), which is a continuation-in-part of U.S. patent application Ser. No. 09/940,635, filed Aug. 29, 2001 (now U.S. Pat. No. 7,356,837) and claims benefit of U.S. Provisional Patent Application No. 60/650,137. The contents of each of the above-identified applications is incorporated herein by reference in their entirety.

BACKGROUND OF THE INVENTION

1. Field of the Invention

The present invention relates to a centralized identification and authentication system and method for identifying an individual over a communication network such as Internet, to increase security in e-commerce. More particularly a method and system for generation of a dynamic, non-predictable and time dependent SecureCode for the purpose of positively identifying an individual.

2. Description of the Related Art

The increasing use of the Internet and the increase of businesses utilizing e-commerce have led to a dramatic increase in customers releasing confidential personal and financial information, in the form of social security numbers, names, addresses, credit card numbers and bank account numbers, to identify themselves. This will allow them to get access to the restricted web sites or electronically purchase desired goods or services. Unfortunately this type of identification is not only unsafe but also it is not fool proof that the user is really the person he says he is. The effect of these increases is reflected in the related art.

U.S. Pat. No. 5,732,137 issued to Aziz outlines a system and method for providing remote user authentication in a public computer network such as the Internet. More specifically, the system and method provides for remote authentication using a one-time password scheme having a secure out-of-band channel for initial password delivery.

U.S. Pat. No. 5,815,665 issued to Teper et al. outlines the use of a system and method for enabling consumers to anonymously, securely and conveniently purchase on-line services from multiple service providers over a distributed network, such as the Internet. Specifically, a trusted third-party broker provides billing and security services for registered service providers via an online brokering service, eliminating the need for the service providers to provide these services.

U.S. Pat. No. 5,991,408 issued to Pearson, et al. outlines a system and method for using a biometric element to create a secure identification and verification system, and more specifically to an apparatus and a method for creating a hard problem which has a representation of a biometric element as its solution.

Although each of the previous patents outline a valuable system and method, what is really needed is a system and method that offers digital identity to the users and allows them to participate in e-commerce without worrying about the privacy and security. In addition to offering security and privacy to the users, the new system has to be simple for businesses to adopt and also doesn't require the financial institutions to change their existing systems. Such a secure, flexible and scalable system and method would be of great value to the businesses that would like to participate in today's electronic commerce.

None of the above inventions and patents, taken either singularly or in combination, is seen to describe the instant invention as claimed. Thus a centralized identification and authentication system and method solving the aforementioned problems is desired.

For convenience, the term "user" is used throughout to represent both a typical person consuming goods and services as well as a business consuming goods and services.

As used herein, a "Central-Entity" is any party that has user's personal and/or financial information, UserName, Password and generates dynamic, non-predictable and time dependent SecureCode for the user. Examples of Central-Entity are: banks, credit card issuing companies or any intermediary service companies.

As also used herein, an "External-Entity" is any party offering goods or services that users utilize by directly providing their UserName and SecureCode as digital identity. Such entity could be a merchant, service provider or an online site. An "External-Entity" could also be an entity that receives the user's digital identity indirectly from the user through another External-Entity, in order to authenticate the user, such entity could be a bank or a credit card issuing company.

The term "UserName" is used herein to denote any alphanumeric name, id, login name or other identification phrase, which may be used by the "Central-Entity" to identify the user.

The term "Password" is used herein to denote any alphanumeric password, secret code, PIN, prose phrase or other code, which may be stored in the system to authenticate the user by the "Central-Entity".

The term "SecureCode" is used herein to denote any dynamic, non-predictable and time dependent alphanumeric code, secret code, PIN or other code, which may be broadcast to the user over a communication network, and may be used as part of a digital identity to identify a user as an authorized user.

The term "digital identity" is used herein to denote a combination of user's "SecureCode" and user's information such as "UserName", which may result in a dynamic, non-predictable and time dependent digital identity that could be used to identify a user as an authorized user.

The term "financial information" is used herein to denote any credit card and banking account information such as debit cards, savings accounts and checking accounts.

SUMMARY OF THE INVENTION

The invention relates to a system and method provided by a Central-Entity for centralized identification and authentication of users and their transactions to increase security in e-commerce. The system includes:

A Central-Entity: This entity centralizes users personal and financial information in a secure environment in order to prevent the distribution of user's information in e-commerce. This information is then used to create digital identity for the users. The users may use their digital identity to identify themselves instead of providing their personal and financial information to the External-Entities;

A plurality of users: A user represents both a typical person consuming goods and services as well as a business consuming goods and services, who needs to be identified in order to make online purchases or to get access to the restricted web sites. The user registers at the Central-Entity to receive his digital identity, which is then provided to the External-Entity for identification;

A plurality of External-Entities: An External-Entity is any party offering goods or services in e-commerce and needs to authenticate the users based on digital identity.

The user signs-up at the Central-Entity by providing his personal or financial information. The Central-Entity creates a new account with user's personal or financial information and issues a unique UserName and Password to the user. The user provides his Username and Password to the Central-Entity for identification and authentication purposes when accessing the services provided by the Central-Entity. The Central-Entity also generates dynamic, non-predictable and time dependent SecureCode for the user per user's request and issues the SecureCode to the user. The Central-Entity maintains a copy of the SecureCode for identification and authentication of the user's digital identity. The user presents his UserName and SecureCode as digital identity to the External-Entity for identification. When an External-Entity receives the user's digital identity (UserName and SecureCode), the External-Entity will forward this information to the Central-Entity to identify and authenticate the user. The Central-Entity will validate the information and sends an approval or denial response back to the External-Entity.

There are also communications networks for the user, the Central-Entity and the External-Entity to give and receive information between each other.

This invention also relates to a system and method provided by a Central-Entity for centralized identification and authentication of users to allow them access to restricted web sites using their digital identity, preferably without revealing confidential personal or financial information.

This invention further relates to a system and method provided by a Central-Entity for centralized identification and authentication of users to allow them to purchase goods and services from an External-Entity using their digital identity, preferably without revealing confidential personal or financial information.

Accordingly, it is a principal object of the invention to offer digital identity to the users for identification in e-commerce.

It is another object of the invention to centralize user's personal and financial information in a secure environment.

It is another object of the invention to prevent the user from distributing their personal and financial information.

It is a further object of the invention to keep merchants, service providers, Internet sites and financial institutions satisfied by positively identifying and authenticating the users.

It is another object of the invention to reduce fraud and increase security for e-commerce.

It is another object of the invention to allow businesses to control visitor's access to their web sites.

It is another object of the invention to protect the customer from getting bills for goods and services that were not ordered.

It is another object of the invention to increase customers' trust and reduce customers' fear for e-commerce.

It is another object to decrease damages to the customers, merchants and financial institutions.

It is an object of the invention to provide improved elements and arrangements thereof for the purposes described which are inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
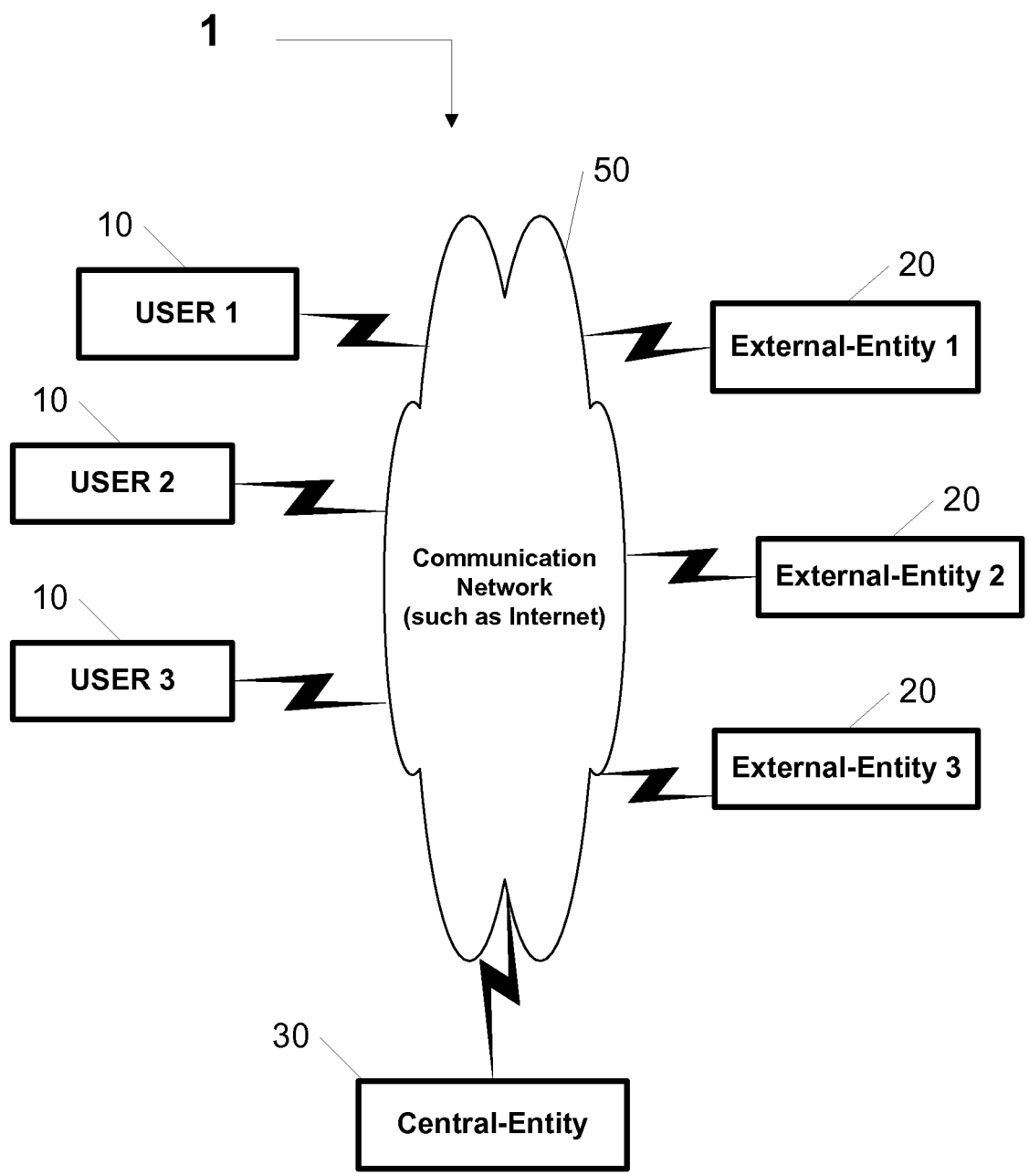
FIG. 1 is a high-level overview of a centralized identification and authentication system and method according to the present invention.

The invention relates to a system 1 and method 2 to identify and authenticate the users and their transactions to increase security in e-commerce. FIG. 1 illustrates a system to positively identify the users 10 in e-commerce based on digital identity.

The system 1 comprises a plurality of users 10, a plurality of External-Entities 20 with goods and services that are desired by the users 10 and a Central-Entity 30 providing a unique UserName and Password to the users 10 and generating dynamic, non-predictable and time dependent SecureCode for the users 10 per user's request. There are also communication networks 50 for the user 10, the Central-Entity 30 and the External-Entity 20 to give and receive information between each other.

It would be desirable to develop a new system 1 and method 2 to centralize user's personal and financial information in a secure environment and to offer digital identity to the users 10 in order to provide privacy, increase security and reduce fraud in e-commerce. Ideally, a secure identification and authentication system 1 would identify legitimate users 10 and unauthorized users 10. This would increase the user's trust, which leads to more sales and cash flow for the merchants/service providers.

The present invention relates to a system 1 and method 2 to support this ideal identification and authentication system. For identification purpose, a digital identity (a unique User-Name and a dynamic, non-predictable and time dependent SecureCode) is used by the user 10 at the time of ordering or at the time of accessing a restricted Internet site. A series of steps describing the overall method are conducted between the users 10, the Central-Entity 30 and the External-Entity 20 and are outlined in FIG. 3, 4, 5.

Figure 2:
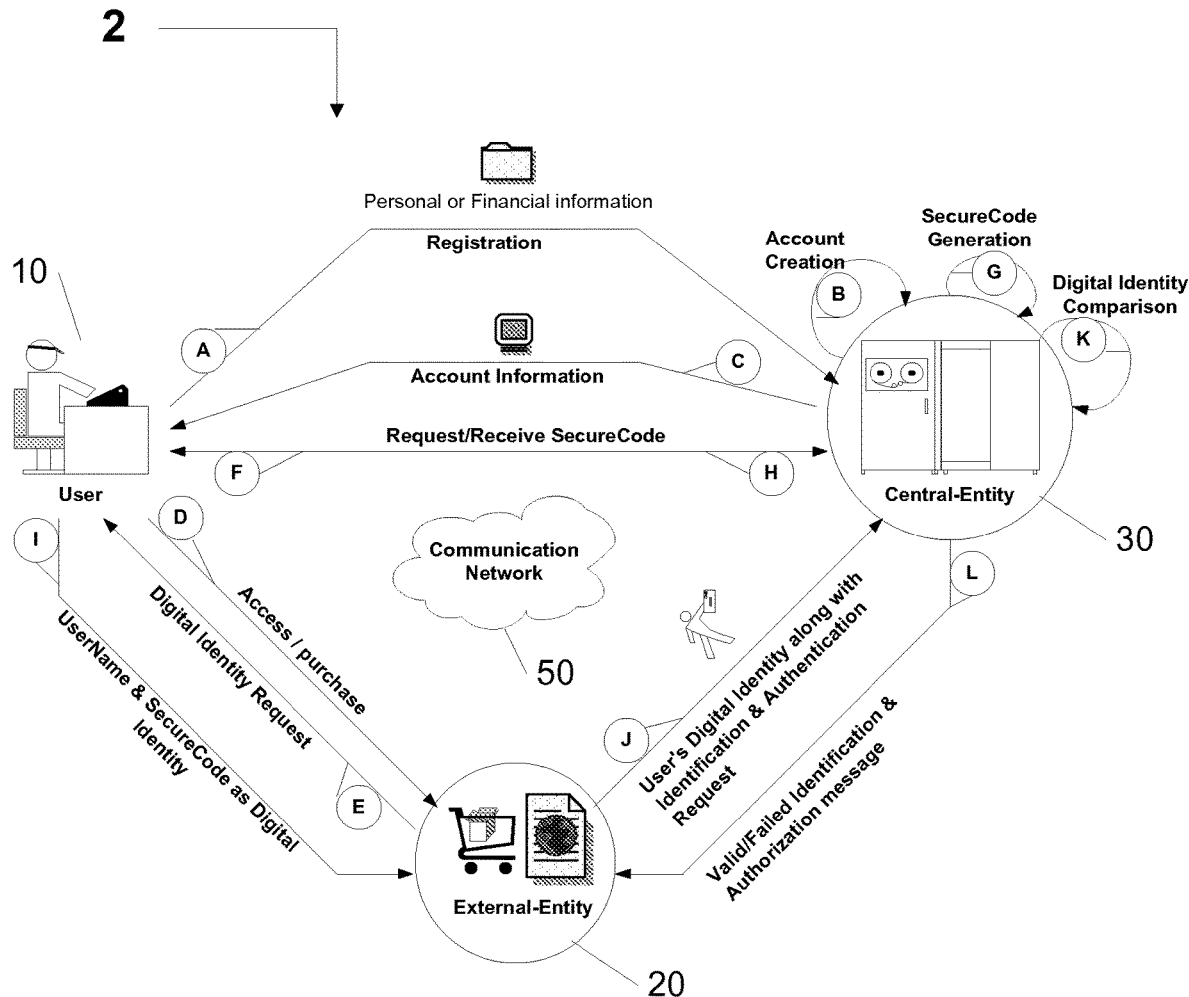
FIG. 2 is a detailed overview of a centralized identification and authentication system and method according to the present invention.
Figure 3:
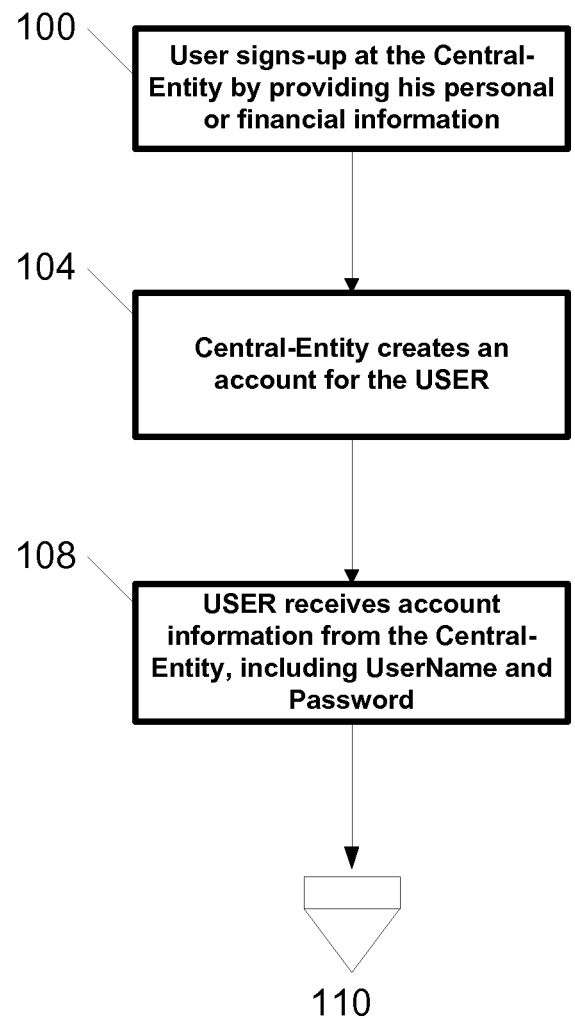
FIG. 3 is a block diagram of the registration of a customer utilizing a centralized identification and authentication system and method according to the present invention.

There are three distinct phases involved in using the centralized identification and authentication system FIG. 2, the first of which being the registration phase, which is depicted in FIG. 3. During the registration phase, the user 10 provides his personal or financial information to the Central-Entity 30. The user 10 registers at the Central-Entity 30, 100, 104 and receives his account and login information such as UserName and Password 108. User 10 can access his account at any time by accessing the Central-Entity's system using a communication network 50 and logging into the system.

Figure 4:
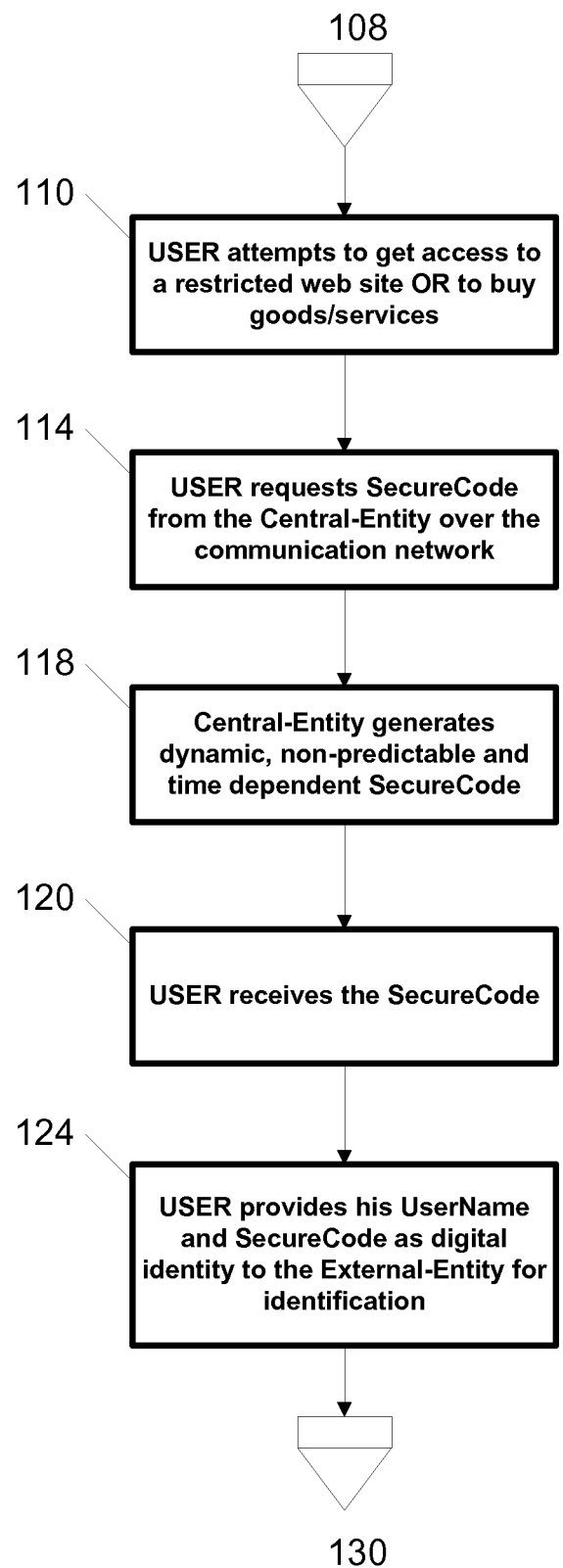
FIG. 4 is a block diagram of the transaction of a customer utilizing a centralized identification and authentication system and method according to the present invention.

Next is the transaction phase, where the user 10 attempts to access a restricted web site or attempts to buy services or products 110, as illustrated in FIG. 4, through a standard interface provided by the External-Entity 20, similar to what exists today and selects digital identity as his identification and authorization or payment option. The External-Entity 20 displays the access or purchase authorization form requesting the user 10 to authenticate himself using his UserName and SecureCode as digital identity. The user 10 requests SecureCode from the Central-Entity 30 by accessing his account over the communication network 50, 114. The Central-Entity 30 generates dynamic, non-predictable and time dependent SecureCode 118 for the user 10. The Central-Entity 30 maintains a copy of the SecureCode for identification and authentication of the user 10 and issues the SecureCode to the user 10. When the user 10 receives the SecureCode 120, the user 10 provides his UserName and SecureCode as digital identity to the External-Entity 20, 124, FIG. 4.

Figure 5:
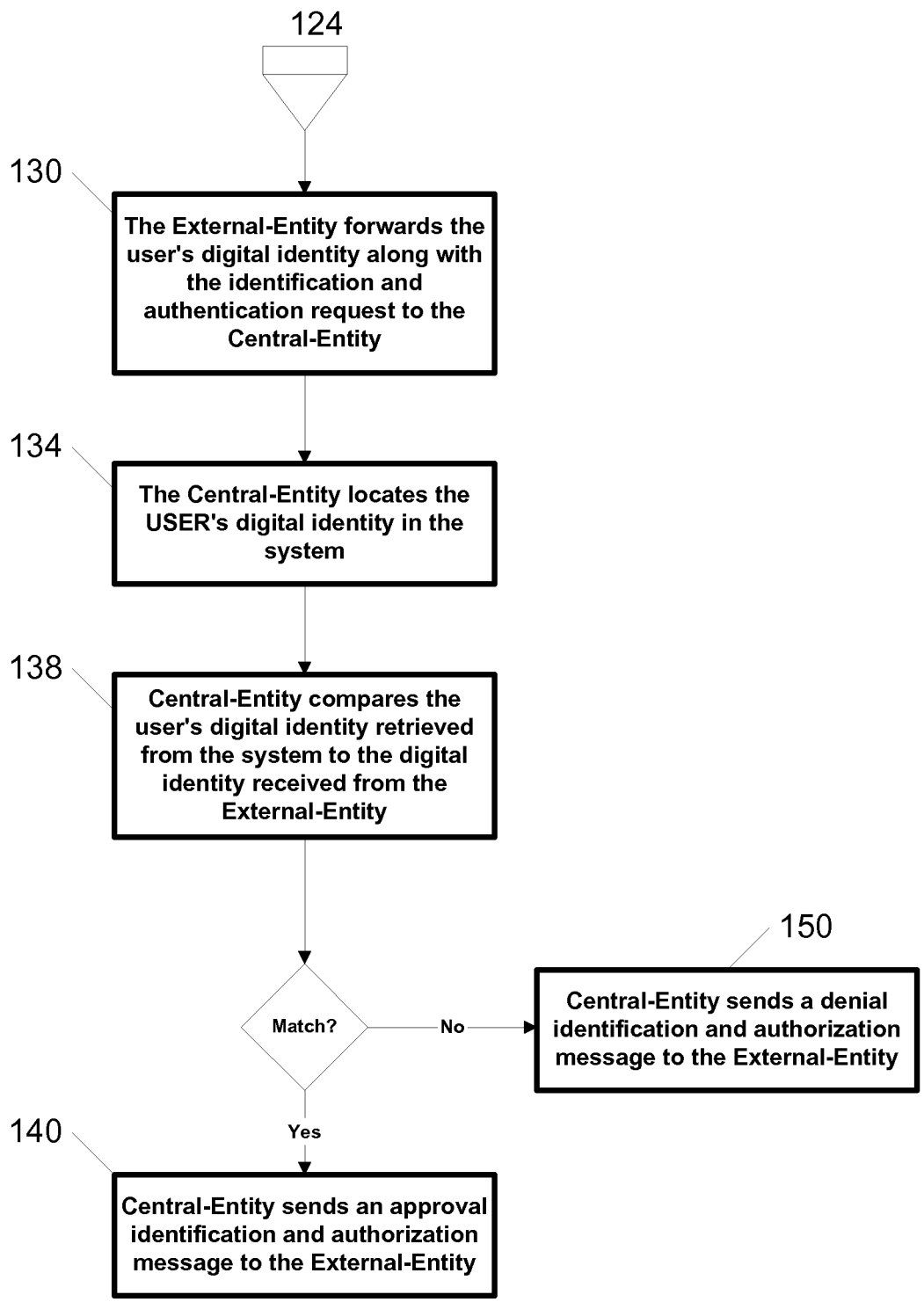
FIG. 5 is a block diagram of a Central-Entity authorizing a user utilizing a centralized identification and authentication system and method according to the present invention.

The third phase is identification and authorization phase. Once the user 10 provides his digital identity to the External-Entity 20, the External-Entity 20 forwards user's digital identity along with the identification and authentication request to the Central-Entity 30, 130, as illustrated in FIG. 5. When the Central-Entity 30 receives the request containing the user's digital identity, the Central-Entity 30 locates the user's digital identity (UserName and SecureCode) in the system 134 and compares it to the digital identity received from the External-Entity 20 to identify and validate the user 10, 138. The Central-Entity 30 generates a reply back to the External-Entity 20 via a communication network 50 as a result of the comparison. If both digital identities match, the Central-Entity 30 will identify the user 10 and will send an approval of the identification and authorization request to the External-Entity 20, 140, otherwise will send a denial of the identification and authorization request to the External-Entity 20, 150. The External-Entity 20 receives the approval or denial response in a matter of seconds. The External-Entity 20 might also display the identification and authentication response to the user 10.

To use the digital identity feature, the Central-Entity 30 provides the authorized user 10 the capability to obtain a dynamic, non-predictable and time dependent SecureCode. The user 10 will provide his UserName and SecureCode as digital identity to the External-Entity 20 when this information is required by the External-Entity 20 to identify the user 10.

The Central-Entity 30 may add other information to the SecureCode before sending it to the user 10, by algorithmically combining SecureCode with user's information such as UserName. The generated SecureCode will have all the information needed by the Central-Entity 30 to identify the user 10. In this case the user will only need to provide his SecureCode as digital identity to the External-Entity 20 for identification.

In the preferred embodiment, the user 10 uses the communication network 50 to receive the SecureCode from the Central-Entity 30. The user 10 submits the SecureCode in response to External-Entity's request 124. The SecureCode is preferably implemented through the use of an indicator. This indicator has two states: "on" for valid and "off" for invalid. When the user 10 receives the SecureCode, the SecureCode is in "on" or "valid" state. The Central-Entity 30 may improve the level of security by invalidating the SecureCode after its use. This may increase the level of difficulty for unauthorized user. Two events may cause a valid SecureCode to become invalid:

1. Timer event: This event occurs when the predefined time passes. As mentioned above the SecureCode is time dependent.
2. Validation event: This event occurs when the SecureCode forwarded to the Central-Entity 30 (as part of digital identity) corresponds to the user's SecureCode held in the system. When this happens the Central-Entity 30 will invalidate the SecureCode to prevent future use and sends an approval identification and authorization message to the External-Entity 20,140.

A valid digital identity corresponds to a valid SecureCode. When the SecureCode becomes invalid, the digital identity will also become invalid.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. An authentication system for enhancing computer network security by authenticating a user in an electronic communication between a computing device of the user and an online computer system, the authentication system comprising one or more computing devices configured to perform operations comprising:

while the online computer system is connected to the computing device of the user via a communication network, electronically receiving a request for a SecureCode;

generating the SecureCode;

while the online computer system is connected to the computing device of the user via the communication network, electronically providing to the user the SecureCode in response to the request for the SecureCode, wherein:

the SecureCode is invalid after a predetermined time passes, the SecureCode is invalid after one use of the SecureCode for authentication, and the SecureCode is only valid for authenticating the user; and while the online computer system is connected to the computing device of the user via the communication network, electronically receiving from the online computer system a digital authentication request for authenticating the user, wherein:
the digital authentication request comprises a digital identity of the user, and
the digital identity includes the SecureCode; and
while the online computer system is connected to the computing device of the user via the communication network, authenticating the user by evaluating a validity of the SecureCode included in the digital authentication request.

2. The authentication system of claim 1, wherein the evaluating the validity comprises:
determining that the SecureCode included in the digital authentication request is used before the predefined time passes; and
determining that the SecureCode is used for a first time.

3. The authentication system of claim 2, wherein the operations further include:
while the online computer system is connected to the computing device of the user via the communication network, electronically transmitting a digital user authentication response message to the online computer system, the digital user authentication response message indicating that the user is authenticated.

4. The authentication system of claim 1, wherein the electronic communication comprises a real-time interaction between the computing device of the user and the online computer system.

5. The authentication system of claim 1, wherein the electronic communication comprises accessing restricted information via the communication network.

6. The authentication system of claim 1, wherein the electronic communication comprises accessing a restricted-access website via the communication network.

7. The authentication system of claim 1, wherein the electronic communication comprises accessing an online account of the user via the communication network.

8. The authentication system of claim 1, wherein:
the SecureCode includes alphanumeric characters, wherein an alphanumeric character is either a numeric character, an alphabetic character, a letter, a text, or a symbol; and
wherein the SecureCode is only used to identify the user as an authorized user.

9. The authentication system of claim 1, wherein the digital identity comprises user-identifying information and the SecureCode.

10. An authentication method for enhancing computer network security by authenticating a user in an electronic communication between a computing device of the user and an online computer system, the method comprising:
while the online computer system is connected to the computing device of the user via a communication network, electronically receiving, a request for a SecureCode;
generating the SecureCode;
while the online computer system is connected to the computing device of the user via the communication network, electronically providing to the user the SecureCode in response to the request for the SecureCode, wherein:
the SecureCode is invalid after a predetermined time passes,
the SecureCode is invalid after one use of the SecureCode for authentication, and
the SecureCode is only valid for authenticating the user; and
while the online computer system is connected to the computing device of the user via the communication network, electronically receiving from the online computer system a digital authentication request for authenticating the user, wherein:
the digital authentication request comprises a digital identity of the user, and
the digital identity includes the SecureCode; and
while the online computer system is connected to the computing device of the user via the communication network, authenticating the user by electronically evaluating a validity of the SecureCode included in the digital authentication request.

11. The authentication method of claim 10, wherein the evaluating the validity comprises:
determining that the SecureCode included in the digital authentication request is used before the predefined time passes; and
determining that the SecureCode is used for a first time.

12. The authentication method of claim 11, further comprising:
while the online computer system is connected to the computing device of the user via the communication network, electronically transmitting a digital user authentication response message to the online computer system, the digital user authentication response message indicating that the user is authenticated.

13. The authentication method of claim 10, wherein the electronic communication comprises a real-time interaction between the device of the user and the online computer system.

14. The authentication method of claim 10, wherein the electronic communication comprises accessing restricted information via the communication network.

15. The authentication method of claim 10, wherein the electronic communication comprises accessing a restricted-access website via the communication network.

16. The authentication method of claim 10, wherein the electronic communication comprises accessing an online account of the user via the communication network.

17. The authentication method of claim 10, wherein:
the SecureCode includes alphanumeric characters, wherein an alphanumeric character is either a numeric character, an alphabetic character, a letter, a text, or a symbol; and
wherein the SecureCode is only used to identify the user as an authorized user.

18. The authentication method of claim 10, wherein the digital identity comprises user-identifying information and the SecureCode.

19. A system for enhancing computer network security comprising one or more computing devices configured to perform operations comprising:
engaging in an electronic communication with a computing device of a user via a communication network;
while the system is connected to the computing device of the user via the communication network, electronically sending a request for user-authentication information;
while the system is connected to the computing device of the user via the communication network, electronically receiving from the user a response to the request for user-authentication information, wherein:
the response to the request for user-authentication information comprises a digital identity of the user, the digital identity of the user includes a SecureCode generated by an authentication system and electronically provided to the user, the SecureCode becomes invalid after a predetermined time passes, the SecureCode becomes invalid after one use of the SecureCode for authentication, and the SecureCode is only valid for authenticating the user;

while the system is connected to the computing device of the user via the communication network, electronically sending to the authentication system a digital user authentication request for authenticating the user, wherein the digital user authentication request includes the SecureCode;

while the system is connected to the computing device of the user via the communication network, electronically receiving a response to the digital user authentication request indicating whether the authentication system authenticated the user; and enabling the user to proceed with the electronic communication when the response to the digital user authentication request indicates that the authentication system authenticated the user.

20. The system of claim 19, wherein:

the digital user authentication request includes user-identifying information; and for authenticating the user, the authentication system determines whether the user-identifying information included in the digital user authentication request is correct and whether the SecureCode is valid.

21. The system of claim 19, wherein the electronic communication comprises accessing restricted information via the communication network.

22. The system of claim 19, wherein the electronic communication comprises accessing a restricted-access website via the communication network.

23. The system of claim 19, wherein the electronic communication comprises accessing an online account of the user via the communication network.

24. The system of claim 19, wherein:

the SecureCode includes alphanumeric characters, wherein an alphanumeric character is either a numeric character, an alphabetic character, a letter, a text or a symbol; and wherein the SecureCode is only used to identify the user as an authorized user.

25. The system of claim 19, wherein, after receiving the response to the digital user authentication request, the SecureCode is invalid for all subsequent requests for authenticating the user.

26. The system of claim 19, wherein the electronic communication comprises a real-time interaction between the user and an online site.

27. The system of claim of 26, wherein the sending the request for user-authentication information, receiving the response to the request for user-authentication information, the sending the digital user authentication request, and the receiving the response to the digital user authentication request all occur during the real-time interaction.

28. A method for enhancing computer network security comprising:

engaging, by an online computer system, in an electronic communication with a computing device of a user via a communication network;

while the online computer system is connected to the computing device of the user via the communication network, electronically sending a request for user-authentication information;

while the online computer system is connected to the computing device of the user via the communication network, electronically receiving from the user a response to the request for user-authentication information, wherein:

the response to the request for user-authentication information comprises a digital identity of the user, the digital identity of the user includes a SecureCode generated by an authentication system and electronically provided to the user, the SecureCode becomes invalid after a predetermined time passes, the SecureCode becomes invalid after one use of the SecureCode for authentication, and the SecureCode is only valid for authenticating the user;

while the online computer system is connected to the computing device of the user via the communication network, electronically sending to the authentication system a digital user authentication request for authenticating the user, wherein the digital user authentication request includes the SecureCode;

while the online computer system is connected to the computing device of the user via the communication network, electronically receiving a response to the digital user authentication request; and enabling the user to proceed with the electronic communication when the response to the digital user authentication request indicates that the authentication system authenticated the user.

29. The method of claim 28, wherein the digital user authentication request includes user-identifying information; and for authenticating the user, the authentication system determines whether the user identifying information included in the digital user authentication request is correct and whether the SecureCode is valid.

* * * * *